Patented May 27, 1930

1,759,907

UNITED STATES PATENT OFFICE

WOLF KRITCHEVSKY AND KARL A. SCHULTZ, OF CHICAGO, ILLINOIS

PLASTIC COMPOSITION

No Drawing.     Application filed November 20, 1926. Serial No. 149,793.

Our invention relates to a plastic, moldable composition of matter adapted for use in filling cracks and crevices in wood and for surfacing wood, iron, stone, or plaster. The composition possesses the characteristics of extreme tenacity and rigidity and will not be chipped off by friction or ordinary impact.

We are aware that compositions known as floor putties and fillers are at present in use for filling holes and cracks and are used as a base for subsequent paint applications. However, the composition here disclosed presents a number of novel properties and characteristics that are of importance.

Not only will the composition adhere to various materials, but is moldable by hand pressure, can be applied conveniently and becomes very hard after drying. It can be nailed without cracking, sawed, filed, polished, colored and be painted with oil and water colors and stains, and in general has the appearance and characteristics of wood. It can be used not only for filling of cracks and crevices, but also for surfacing materials for ornamental decorations, in which case it is molded to shape and after setting, it is glued or otherwise fixed to the surface.

This composition consists of three essential types of ingredients. The base of the composition is wood flour, or any other fibrous product. As a binder, we use what is commercially known as celluloid, which is composed of gun cotton and camphor or some other plasticizer to prevent it from becoming brittle. Within the scope of binders for this particular composition also fall the various cellulose esters, as nitro-cellulose, acetyl-cellulose, and the cellulose ethers which in combination with a plasticizer, we have successfully substituted for celluloid. The third class of constituents is the use of various solvents. We have found that the type of solvents has a most important bearing upon the efficiency of the product. Some of the ordinary solvents used in connection with this composition have proved to be absolutely useless since they will not allow the adherence of the composition under ordinary working conditions. We have found that the best solvent to use in this connection is acetone. However, since acetone is so very volatile for ordinary usage, we have found that a combination of about equal parts of acetone, alcohol, and benzol gives the more suitable and desirable solvent for most cases. A variation of the solvents will give a composition of varying characteristics, and will find application in specific instances. Besides the aforenamed solvents, we have found that we can use others as carbon tetrachloride, chloroform, and other halogenated hydrocarbons.

We have found that the most suitable and practicable ratio of liquid to solid is about 50 parts to 50 parts. For some particular instances, we have found it advisable and practicable to use a greater quantity of solvent, in other instances, the reverse holds true. For this reason, we do not limit ourselves to a strict percentage ratio of solvent to solid.

We have also found that the addition of small amounts of various chemicals will lend peculiar characteristics to this composition and give it novel effects. As instances, we cite the use of calcium oxide, lead oxide, or magnesium oxide, that will lend an extreme hardness to the composition. Casein, 1% to 5% and linseed oil 1% to 5% will give a smooth surface that is exceedingly hard.

In the following, we give a general method for the preparation of this composition:

The necessary solvents are thoroughly mixed together and introduced into a closed mixing apparatus, together with a requisite amount of celluloid or cellulose esters. These are then mixed for a requisite time, or allowed to remain together overnight. A syrupy liquid is obtained at the end of the mixing, and this is then kneaded and mixed with the requisite amount of wood flour or other suitable fibrous material, until the desired consistency is attained. The composition is then ready for use.

We cite the following modifications of the compositions which give the desired results and which we have found entirely satisfactory, the proportions being by weight:

1. 30 parts celluloid.
    90 parts solvent.
    33 parts wood flour.

2. 15 parts celluloid.
   45 parts solvent.
   0.1 part boiled linseed oil.
   10 parts wood flour.

3. 10 parts celluloid.
   45 parts solvent.
   2.5 parts talc.
   10 parts wood flour.

4. 10 parts celluloid.
   45 parts solvent.
   3 parts casein.
   0.5 part calcium oxide.
   1.5 parts talc.
   10 parts wood flour.

5. 12 parts celluloid.
   40 parts solvent.
   10 parts magnesium oxide.
   5 parts magnesium nitrate.

6. 24 parts celluloid.
   24 parts acetone.
   24 parts alcohol.
   24 parts benzol.
   24 parts wood flour.
   4 parts talc.

7. 12 parts celluloid.
   12 parts acetone.
   14 parts alcohol.
   14 parts benzol.
   12.66 parts wood flour.
   2.00 parts casein.
   .33 part calcium oxide.
   1.00 part talc.

8. 20% celluloid.
   20% alcohol.
   20% acetone.
   20% benzol.
   20% wood flour.

It will be obvious that the exact proportions specified are not essential for satisfactory results and we do not wish to be limited except as indicated in the appended claims.

We claim:

1. A plastic moldable composition of matter consisting of approximately 20% each of celluloid, acetone, alcohol, benzol and wood flour.

2. A plastic modable composition of matter that may be worked by hand without mechanical pressure or apparatus consisting of celluloid, acetone, the acetone being at least equal in amount to the amount of celluloid used, alcohol, benzol, and wood flour.

In testimony whereof we have affixed our signatures.

WOLF KRITCHEVSKY.
KARL A. SCHULTZ.